United States Patent [19]

Kanemaru et al.

[11] Patent Number: 5,707,541
[45] Date of Patent: Jan. 13, 1998

[54] PREPARATION OF FERRITE FROM USED DRY CELLS

[75] Inventors: Takashi Kanemaru, Chiba; Takaaki Iwasaki, Hokkaido; Shigeaki Suda, Akita; Takeo Kitagawa, Chiba, all of Japan

[73] Assignees: Nomura Kohsan Co., Ltd.; TDK Corporation, both of Tokyo, Japan

[21] Appl. No.: 712,286

[22] Filed: Sep. 11, 1996

[30] Foreign Application Priority Data

Sep. 12, 1995 [JP] Japan ............................ 7-259382

[51] Int. Cl.⁶ .......................... H01M 6/52; B09B 5/00; H01F 1/34; C04B 35/26

[52] U.S. Cl. .................... 252/62.56; 252/62.62; 241/24; 241/23

[58] Field of Search ................ 252/62.62, 62.56; 241/24, 23; 421/29, 20, 25, DIG. 38

[56] References Cited

U.S. PATENT DOCUMENTS 5,498,360  3/1996  Kanemaru et al. ............... 232/62.36
5,575,907  11/1996  Lindermann ..................... 205/580

FOREIGN PATENT DOCUMENTS 0 247 023  11/1987  European Pat. Off. .
0 632 514  1/1995  European Pat. Off. .
7-81941  3/1995  Japan .
7-85897  3/1995  Japan .

OTHER PUBLICATIONS

Database WPI, Derwent Publications, AN 95-110350, JP-A-07 033 442, Feb. 3, 1995.

*Primary Examiner*—Melissa Bonner
*Attorney, Agent, or Firm*—Oblon, Spivak, McClelland, Maier & Neustadt, P.C.

[57] ABSTRACT

Used dry cells are sorted into ultra-high power manganese dry cells and high power manganese dry cells including alkaline manganese cells. Line (I) of FIG. 1 includes crushing the ultra-high power manganese dry cells into fragments, sieving the fragments to collect a first fraction of depolarizer mass and a second fraction of metal casings, calcining the first fraction to form manganese and zinc oxides, and processing the oxides into a ferrite having a higher MnO/ZnO ratio. Line (II) of FIG. 1 includes crushing the high power manganese dry cells including alkaline manganese cells into fragments, sieving the fragments to collect a third fraction of depolarizer mass, adding zinc cans from the second fraction to the third fraction, calcining the mixture to form manganese and zinc oxides, and processing the oxides into another ferrite having a lower MnO/ZnO ratio.

1 Claim, 1 Drawing Sheet

PREPARATION OF FERRITE FROM USED DRY CELLS

BACKGROUND OF THE INVENTION

1. Field of the Invention

This invention relates to a process for preparing ferrite from used dry cells and more particularly, to a process for preparing ferrite from used dry cells by sorting used manganese dry cells into a first group of ultra-high power manganese dry cells and a second group of high power manganese dry cells and alkaline manganese cells, and preparing two types of ferrite from the respective groups.

2. Prior Art

More and more dry cells are used in the recent years as electric appliances are reduced in size and weight and portable devices are on widespread use. Most dry cells used as the primary battery are of manganese and alkaline manganese types. After use, most of them are discarded along with domestic waste. In some cases, used dry cells are incinerated in municipal incinerator plants together with domestic waste. Alternatively, they are collected as recyclable waste together with other potentially valuable wastes and disposed of for recovery.

In consideration of the recent demand for environmental preservation, resource saving and waste volume reduction, various proposals have been made for the disposal of the collected used dry cells. For instance, there are processes for classifying dry cells in terms of type, disintegrating dry cells, and separating valuable materials for recovery.

Kanemaru et al., U.S. Pat. No. 5,498,360, which is incorporated herein by reference, (corresponding to JP-A 7-85897 and 7-81941 and EP A 632514) discloses a process for sorting manganese dry cells out of used-up dry cells, further sorting the manganese dry cells into a ultra-high power grade of manganese dry cells and a high power grade of manganese dry cells (the grade is described in Columns 4–5 of the patent), and recovering depolarizer mass from each grade. The patent also discloses a process for preparing ferrite from the depolarizer mass recovered from each grade. Since manganese dry cells are classified in terms of grade and ferrite is prepared from the depolarizer mass of each grade, the process is not successful in effective utilization of non-oxides such as zinc cans and alkaline manganese dry cells.

SUMMARY OF THE INVENTION

Therefore, an object of the present invention is to provide a process for preparing ferrite from used dry cells by sorting used manganese dry cells into a first group of ultra-high power manganese dry cells and a second group of high power manganese dry cells and alkaline manganese cells, recovering a depolarizer mass from each group, and obtaining practically acceptable ferrites of different compositions from the respective mix portions. The process of the invention is more advantageous from the standpoints of resource saving and environmental protection.

The present invention provides a process for preparing ferrite from used dry cells by sorting used dry cells into ultra-high power manganese dry cells and high power manganese dry cells including alkaline manganese cells. The ultra-high power manganese dry cells are disposed of by crushing them into fragments, sieving the fragments to collect a first fraction composed mainly of positive pole substances and a second fraction containing metal casings, calcining the first fraction composed mainly of positive pole substances to form manganese oxides and zinc oxides, and processing the manganese oxides and zinc oxides into a ferrite having a manganese oxide/zinc oxide molar ratio A. A zinc value is separated from the second fraction. The high power manganese dry cells including alkaline manganese cells are disposed of by crushing them into fragments, sieving the fragments to collect a third fraction composed mainly of positive and negative pole substances, adding the zinc value from the second fraction to the third fraction, calcining the mixture to form manganese oxides and zinc oxides, and processing the manganese oxides and zinc oxides into another ferrite having a manganese oxide/zinc oxide molar ratio B. A/B should be greater than unity (1). It is noted that throughout the disclosure, manganese oxides and zinc oxides are calculated as MnO and ZnO, respectively, when a molar ratio is referred to.

According to the invention, manganese dry cells are selected from used dry cells by shape and weight sorting techniques. The manganese dry cells are further sorted into a ultra-high power group consisting of ultra-high power manganese dry cells "PU" (black type) and a high power group consisting of high power manganese dry cells "P" (red type) and alkaline manganese cells.

After the sorting step, the black type of dry cells and the red type of dry cells are separately crushed into fragments which are sieved to collect a fraction composed mainly of positive pole substances (or depolarizer mass). When the fragments from the black type of dry cells are sieved, there are obtained an undersize fraction composed mainly of depolarizer mass and an oversize fraction composed mainly of metal casings. Since the oversize fraction composed mainly of metal casings contains fragments of iron jackets and zinc cans, it can be separated into iron and zinc values by magnetic separation. The zinc value thus separated is combined with the depolarizer mass collected from the red type of dry cells including alkaline manganese cells.

The fraction of depolarizer mass originating from fragments of the black type is calcined, yielding manganese and zinc oxides.

The mixture of the fraction of depolarizer mass collected from the red type of dry cells including alkaline manganese cells with the zinc value collected from the black type is calcined, yielding manganese and zinc oxides.

The calcined products may be refined by washing with water to remove impurities such as alkali and alkaline earth metal oxides.

The calcined products are separately pulverized into powders ready for use as a ferrite source. The calcined product originating from the depolarizer mass of the black type is a source from which is prepared a first ferrite having a manganese oxide/zinc oxide molar ratio A, typically of at least 0.8, especially between 0.8 and 6.0, for example, between 35.5/11.5 and 38.2/8.0. The calcined product originating from the depolarizer mass of the red type cells and alkaline manganese cells is a source from which is prepared a second ferrite having a manganese oxide/zinc oxide molar ratio B, typically of up to 0.5, especially between 0.01 and 0.5, for example, about 6.0/18.0. The first and second ferrites have different compositions such that the first ferrite's MnO/ZnO molar ratio A is greater than the second ferrite's MnO/ZnO molar ratio B. Differently stated, A>B, that is, A/B>1.

Using the calcined product as a source, ferrite is preferably prepared by a dry process. High performance ferrite is obtained from the calcined product of the depolarizer mass of the black type whereas general purpose ferrite is obtained from the calcined product of the depolarizer mass of the red type and alkaline manganese cells plus the zinc value of the black type.

The present invention produces two types of ferrite by making entire use of the raw materials recycled from the black type and the red type inclusive of alkaline manganese cells.

BRIEF DESCRIPTION OF THE DRAWINGS

These and further features of the present invention will be apparent with reference to the following description and drawings, wherein.

The only figure.

DETAILED DESCRIPTION OF THE INVENTION

Figure 1:
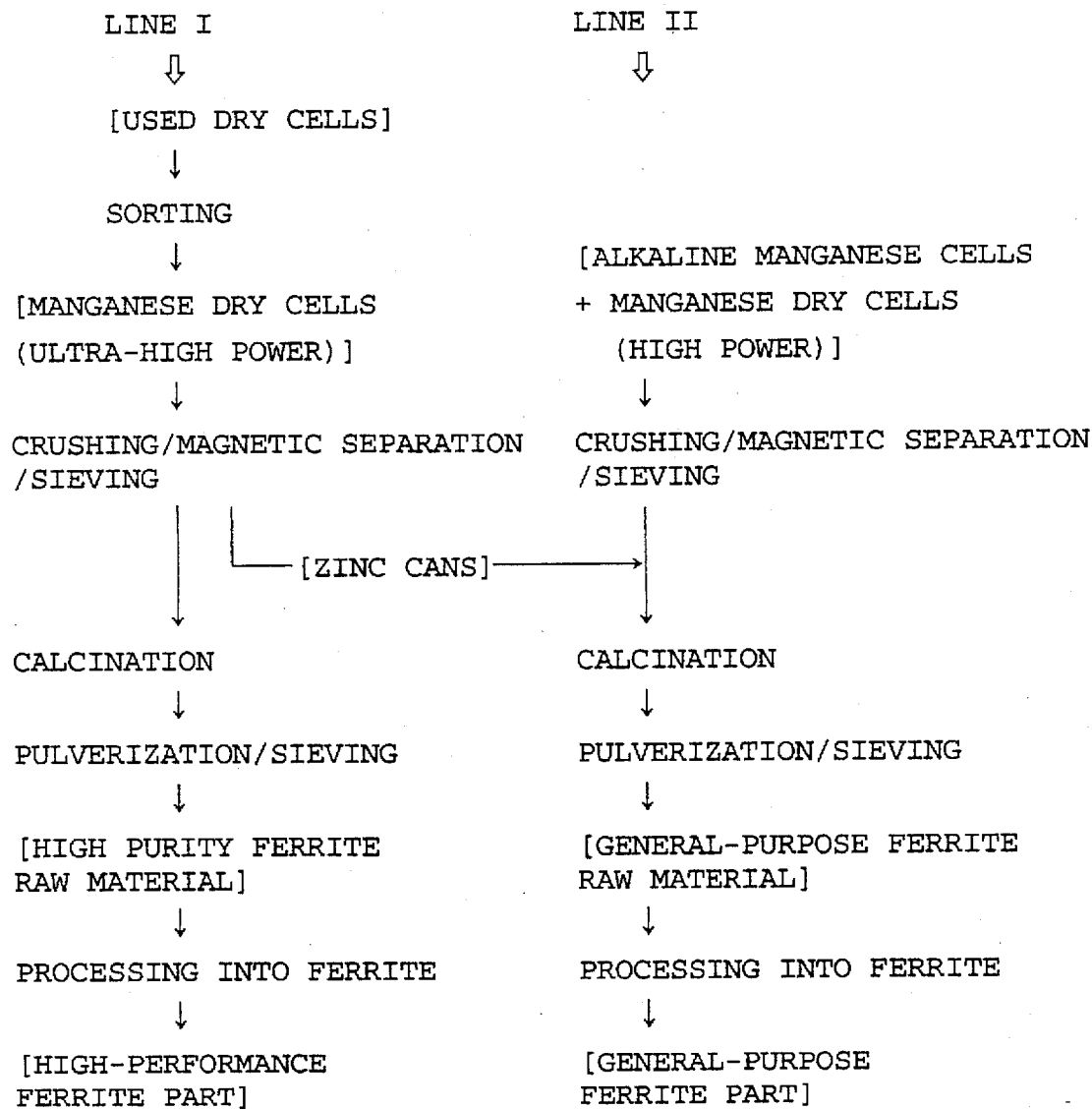
FIG. 1 is a flowchart showing a process for producing two types of ferrite from used dry cells according to the invention.

According to the invention, manganese dry cells and alkaline manganese cells are selected from used dry cells. The manganese dry cells are further sorted into black and red types. Dry cells of the black type are processed alone, obtaining a high performance ferrite of MnO-ZnO system. On the other hand the red type is processed together with the alkaline manganese cells and combined with a zinc value resulting from the processing of the black type, obtaining general purpose ferrite of MnO-ZnO-MgO system.

The high performance ferrite has a manganese oxide/zinc oxide molar ratio A, typically of at least 0.8, especially between 0.8 and 6.0, for example, between 35.5/11.5 and 38.2/8.0, calculated as MnO and ZnO, respectively. The general purpose ferrite has a manganese oxide/zinc oxide molar ratio B, typically of up to 0.5, especially between 0.01 and 0.5, for example, about 6.0/18.0. A/B is greater than 1. According to the invention, used dry cells are divided through the sorting step into two groups, which are processed into two mixtures of manganese oxide and zinc oxide, which are, in turn, processed into two types of ferrite by a dry process.

Referring to FIG. 1, one preferred embodiment of the process for preparing ferrite according to the present invention is described.

(1) Sorting step

Alkaline manganese cells and manganese dry cells are selected from a variety of used dry cells. The manganese dry cells are further sorted in terms of grade into a black type consisting of ultra-high power manganese dry cells "PU" and a red type consisting of high power manganese dry cells "P". In general, a recycle collection of waste dry cells is a mixture of various types of cells including lithium cells, mercury cells, and nickel-cadmium cells as well as alkaline manganese cells and manganese dry cells. Alkaline manganese cells and manganese dry cells are first sorted out of used dry cells.

More particularly, used dry cells are sorted in terms of shape into a cylindrical form of SUM-1, SUM-2, and SUM-3 cells, which occupy the majority of alkaline manganese cells and manganese dry cells, and another form of cells. For this sorting, a shape sorter may be used for continuously separating a large collection of used dry cells.

Then manganese dry cells are separated from alkaline manganese cells by weight sorting. Weight sorting utilizes the fact that an alkaline manganese cell is heavier than a manganese dry cell provided that they are of the same SUM-1 class. For this sorting, a weight sorter may be used for continuously separating a large quantity of dry cells.

The thus sorted-out manganese dry cells are then separated into black and red types by color sorting. Black and red colors appear predominant in the black and red types, respectively. For this color sorting, a color sorter may be used for continuously separating a large quantity of dry cells. The color sorting into black and red types may be combined with the weight sorting. Each of the black and red types may be further sorted into cells of different manufacturers, which may be done by color sorting or by sorting in terms of manufacturer name, typically trade mark. The sorting into black and red types is followed by the sorting for each manufacturer and vice versa.

After manganese dry cells are sorted into black and red types, cells of the black type are kept as a single group whereas cells of the red type are combined with the pre-sorted alkaline manganese cells. Cells of the black type are processed alone in accordance with line (I). Cells of the red type are processed together with alkaline manganese cells in accordance with line (II).

Line (I)

Line (I) of processing cells of the black type is first described.

(2) Crushing, magnetic separation, and sieving steps

A crushing step aims to separate cell constituents into a fraction composed mainly of a depolarizer mass and another fraction. To this end, cells are crushed into fragments by means of a crusher such that the depolarizer mass may be fractured to a size of less than 2 mm while the remaining constituents may be fractured to a size of more than 2 mm. A swing hammer crusher having a built-in screen may be used, for example. It is desired to control the peripheral speed of the crusher so as to prevent over-crushing of carbon rods and paper to less than 2 mm. Moreover, oversize fragments to be crushed to a size in excess of 2 mm may be crushed and separated in several stages. A part of crushing may be wet crushing.

Many crushers used in the crushing step have dual functions of crushing and separation by sieving to be described below. A fraction composed mainly of the depolarizer mass can be effectively separated by repeatedly crushing and sieving oversize fragments.

Fragments of varying size resulting from the crushing step are sieved into an undersize fraction and an oversize fraction. The undersize fraction consists of fragments having a predetermined size of less than 2 mm, for example, and is composed mainly of the depolarizer mass, that is, manganese oxide and zinc oxide. The oversize fraction consists of fragments having a predetermined size of more than 2 mm, for example, and is composed mainly of metallic iron, zinc cans, carbon rods, paper and plastics. A suitable sieving machine such as a vibrating screen and trommel screen may be used for sieving although such a screen is often built in the crusher as mentioned above. The screen of the sieving machine has an opening which is selected depending on the predetermined size of fragments composed mainly of the depolarizer mass, typically an opening size of about 1 to 4 mm, preferably about 2 mm.

By repeating crushing and sieving of the oversize fragments one more time or twice, about 75 to 80% by weight of the depolarizer mass contained in all the crushed manganese dry cells can be separated as the undersize fraction. After fragments are sieved into the undersize and oversize fractions, the respective fractions are independently processed.

The oversize fraction is subject to air elutriation for separating paper and plastics from the oversize fraction through the action of a stream of air. The recovered paper and plastics are not recyclable and they are incinerated for disposal. It is understood that air elutriation is carried out concomitantly with the crushing step. Air elutriation is preferably repeated at transfer and sieving steps that are optionally taken when crushing is repeated several times.

After the oversize fraction is subject to air elutriation, it is subject to magnetic separation whereby a magnetic material in the form of iron jacket fragments is magnetically separated from non-magnetic fragments. A drum type magnetic separator or magnet roller may be used, for example. If required, these iron jacket fragments are reduced in volume by crushing, sieving, pressing, and so forth and if required, they can be recovered as metallic iron by refinement. The thus recovered iron has a purity of the order of 97.5 to 98.8%. To effectively recover the iron jackets alone, it is preferred that magnetic separation be repeated whenever the oversize fraction is repeatedly crushed and sorted.

From the non-magnetic matter resulting from the magnetic separation step, a zinc value composed mainly of zinc cans is recovered by crushing and sieving. The screen used for zinc recovery usually has an opening size of about 4 to 6 mm. The zinc value recovered is to be processed together with the red type and alkaline manganese cells.

(3) Calcining step

The undersize fraction collected from cells of the black type by crushing and sieving is a solid matter composed mainly of manganese and zinc compounds originating from the depolarizer mass. It is then calcined in a calcination furnace usually at an internal temperature of about 700° to 950° C. for about 1 to 7 hours.

Through calcination under such conditions, manganese compounds are converted into various lower to higher manganese oxides and zinc compounds are converted into zinc oxides. It is also possible to volatilize off chlorine residues and remove carbon residues.

Since carbon residues must be removed from the depolarizer mass before the manganese and zinc compounds originating from the depolarizer mass are used for dry ferrite production, it is desired that calcination be carried out for a longer time, e.g., for about 4 to 7 hours. It is also desired that an oxidizing atmosphere prevail in the calcination furnace for removal of carbon residues. In the present disclosure, it is understood that the oxidizing atmosphere refers to one in which higher manganese oxides are formed.

(4) Pulverizing and sieving steps

The calcined product is pulverized to or below a predetermined particle size. Pulverization may be carried out by a pulverizer having a built-in screen with an opening size of about 0.2 to 0.4 mm. Although the above-mentioned pulverizer has an additional function of sieving, it is acceptable to carry out further sieving using a screen having a predetermined opening size. The extra sieving is effective for subsequent dry ferrite production because iron and carbon contaminants picked up from the machinery can be removed by sieving.

The pulverized product is a mixture composed mainly of manganese and zinc oxides and having a manganese oxide content of about 57 to 66% by weight calculated as MnO and a zinc oxide content of about 26 to 32% by weight calculated as ZnO. The pulverized product also contains impurities such as Cl, C, $SiO_2$, CaO, MgO, P, $Na_2O$, and $K_2O$. In most cases, impurities are present in amounts of about 0.03 to 0.60% by weight of Cl, about 0.02 to 0.5% by weight of C, about 0.01 to 0.06% by weight of $SiO_2$, about 0.015 to 0.06% by weight of CaO, about 0.015 to 0.04% by weight of MgO, about 0.003 to 0.01% by weight of P, about 0.02 to 0.03% by weight of $Na_2O$, and about 0.01 to 0.03% by weight of $K_2O$.

The amounts of these impurities in the pulverized product may be properly controlled depending on a particular purpose. For use as a source for high performance ferrite, for example, the pulverized product containing the above-mentioned amounts of impurities is acceptable although the amounts of impurities are preferably limited, especially to less than 0.3% by weight of chlorine and less than 0.2% by weight of carbon. Additionally, $Fe_2O_3$ is contained in an amount of 2 to 3% by weight. Iron oxide is rather useful since it is one of raw materials for ferrite.

If desired, the calcined product may be purified by washing it with water for removing undesirable impurities such as sodium and potassium compounds, calcium oxide and chlorides originating from the polarizing mix.

In this way, a source for high performance ferrite, that is, a high purity ferrite raw material is recovered from cells of the black type.

Line (II)

Line (II) of processing cells of the red type and alkaline manganese cells, to be referred to as cells of the second group, is now described.

As a general rule, processing of cells of the second group is approximately the same as the aforementioned processing of cells of the black type. The only difference is to process together the zinc cans which are sorted out in the crushing/magnetic separation/sieving steps (2) in the processing of the black type.

Since it is intended that a source for general purpose ferrite be recovered from dry cells of the second group, higher zinc contents are desirable. Then the depolarizer mass recovered from dry cells of the second group through the crushing/magnetic separation/sieving steps (2) is calcined together with the zinc value serving as a negative pole or anodic substance.

Since zinc cans are recovered in fragment form from cells of the black type, fractured zinc cans of the black type may be simply added to the depolarizer mass recovered from dry cells of the second group. Alternatively, zinc cans of the black type are crushed together with dry cells of the second group.

The combined fractions to be calcined in line (II) form a mixture of a wider variety of constituents than the fraction to be calcined in line (I) for the black type, calcination should preferably be carried out at a somewhat higher temperature and/or for a somewhat longer time than in line (I) in order to accomplish more effective conversion into oxides and removal of impurities.

The calcined and pulverized product originating from cells of the second group is a mixture composed mainly of manganese and zinc oxides and having a manganese oxide content of about 20 to 30% by weight calculated as MnO and a zinc oxide content of about 45 to 65% by weight calculated as ZnO. It also contains impurities, typically about 0.08 to 0.35% by weight of chlorine, about 0.1 to 0.5% by weight of carbon, about 0.3 to 0.7% by weight of $SiO_2$, about 0.04 to 0.13% by weight of CaO, about 0.03 to 0.08% by weight of MgO, about 0.02 to 0.06% by weight of P, about 0.02 to 0.07% by weight of $Na_2O$, and about 0.06 to 0.25% by weight of $K_2O$.

In this way, a source for general purpose ferrite is recovered from dry cells of the second group.

From the high purity ferrite raw material and the general purpose ferrite raw material separately recovered from the two lines, ferrites are then separately produced in accordance with a conventional ferrite producing process.

A dry process is preferred for the production of ferrite. One exemplary process is described below.

The high purity ferrite raw material recovered from cells of the black type is mixed with commercially available ferric oxide in a predetermined proportion. If required, commercially available trimanganese tetraoxide and zinc oxide are added to the mixture for compositional control. To improve the magnetic properties of ferrite, minor amounts of additives may be added besides the incidental impurities in the above-mentioned oxides. Mixing may be carried out in a dry or wet mixer. A suitable solvent such as water may be added if desired. After mixing, the mixture is dried by means of a spray dryer and calcined in an air atmosphere at a temperature of 700° to 1,100° C. for about 1 to 4 hours. The thus calcined product is pulverized to a predetermined particle diameter (of 1.0 to 3.0 µm on the average) by means of a crusher or fine grinding mill, followed by drying with a spray dryer, etc., granulation, and forming into a compact of desired shape. The compact is then fired or sintered. For sintering, an electric furnace may be used, and the sintering temperature, time and atmosphere may be conventional. Usually, the sintering atmosphere is air or a mixture of air and nitrogen, the sintering temperature is 1,150° to 1,400° C., and the sintering time is about 1 to 5 hours. In this way, there is obtained a high performance ferrite part belonging to the MnO-ZnO ferrite category.

Like the process for the black type, a general purpose ferrite part is obtained from the general purpose ferrite raw material recovered from cells of the second group by adding thereto commercial metal oxides or precursors (e.g., hydroxides) which are converted into metal oxides upon calcination, and similarly processing the general purpose ferrite raw material mixture.

The thus obtained ferrites are suitable for use in power supply transformers, transformers in communications and radio equipment, deflecting yokes in CRTs, electromagnetic noise filters, and carrier for copiers.

EXAMPLE

Examples of the present invention are given below by way of illustration and not by way of limitation.

Example 1

Through a suitable combination of shape, weight, and color sorting, 1,000 kg of waste dry cells was sorted into 400 kg of the black type and 600 kg of the red type and alkaline manganese cells.

Line (I)

Cells of the black type were treated as follows. Using a swing hammer crusher with a built-in screen, 400 kg of black type cells were crushed and sieved. The screen used was a vibrating screen provided with a sieve having an opening of 2 mm. The dry cells were crushed at such a peripheral speed that the depolarizer mass was fractured to a size of less than 2 mm. Crushing and sieving were repeated twice for an oversize fraction exceeding 2 mm. In this way, there was finally obtained 200 kg of a powder fraction composed mainly of the depolarizer mass and having a size of less than 2 mm. Using a calcining furnace, the powder was calcined in an oxidizing atmosphere at a temperature of about 800° C. for about 5 hours. The calcined product was then pulverized by means of a pulverizer with a built-in screen having an opening size of 0.3 mm, obtaining 108 kg of the calcined and pulverized product. On analysis, the pulverized product contained 59.7% by weight of MnO, 28.7% by weight of ZnO, 2.6% by weight of $Fe_2O_3$, 0.06% by weight of C, and 0.09% by weight of Cl.

To 81 kg of the calcined and pulverized product, 287 kg of ferric oxide and 42 kg of trimanganese tetraoxide, both commercially available, were added so as to provide a predetermined ferrite composition. It is noted that the raw materials were powders having a mean particle size of about 3 µm. After the raw materials were mixed in a wet mixer, the mixture was granulated by a pan granulator and calcined at 950° C. for 2 hours. The calcined powder was further pulverized to a mean particle size of 1.5 µm by means of a crusher and a fine grinding mill, granulated by a spray dryer, and molded into a toroidal shape by means of an automatic powder-molding machine. Using an electric furnace, the molded body was sintered in a mixed atmosphere of air and nitrogen (oxygen partial pressure 0.1 to 5%, 1 arm.) at 1,350° C. for 3 hours.

There was obtained an annular magnetic core made of MnO-ZnO ferrite, which was dimensioned 31 mm in outer diameter, 19 mm inner diameter and 7 mm in thickness. On analysis, the ferrite core was composed of 53.8 mol% of $Fe_2O_3$, 38.2 mol% of MnO and 8.0 mol% of ZnO. The ferrite core was measured for magnetic properties, finding a saturation flux density of 490 mT, an initial permeability of 2,000, and a core loss of 500 $kW/m^3$. It was confirmed practically acceptable as a magnetic core for power supply transformers.

The oversize fraction resulting from the sieving step, 200 kg, was subject to air elutriation by blowing air at a speed of 12 to 17 m/s, collecting 12 kg of a lighter fraction consisting essentially of paper and plastics. The lighter fraction was incinerated and discarded. Iron jacket fragments were magnetically separated from the oversize fraction by means of a drum type magnetic separator or magnet roller. Magnetic separation was repeated whenever the oversize fraction was repeatedly crushed and sieved. The thus collected iron scraps summed to 44 kg. The scrap iron was 98% pure. The non-magnetic fraction separated by magnetic separation was crushed by a crusher and passed through a screen with an opening size of 5 mm. That is, carbon rods were crushed to an undersize and separated from a fraction composed mainly of zinc cans. As a result of crushing and sieving, there was collected 56 kg of zinc cans.

Line (II)

Using a swing hammer crusher with a built-in screen, 600 kg of red type cells and alkaline manganese cells were crushed and sieved. The screen used was a vibrating screen provided with a sieve having an opening of 2 mm. The dry cells were crushed at such a peripheral speed that the depolarizer mass was fractured to a size of less than 2 mm. Crushing and sieving were repeated twice for an oversize fraction exceeding 2 mm. In this way, there was finally obtained 384 kg of a powder fraction composed mainly of the depolarizer mass and having a size of less than 2 mm. This powder was combined with 56 kg of zinc cans recovered from black type cells. Using a calcining furnace, the mixture was calcined in an oxidizing atmosphere at a temperature of about 800° C. for about 6 hours. The calcined product was then pulverized by means of a pulverizer with a built-in screen having an opening size of 0.3 mm, obtaining 336 kg of the calcined and pulverized product. On analysis, the pulverized product contained 24.8% by weight of MnO, 59.6% by weight of ZnO, 1.8% by weight of $Fe_2O_3$, 0.2% by weight of C, and 0.2% by weight of Cl.

To 60 kg of the calcined and pulverized product, 350 kg of ferric oxide, 40 kg of zinc oxide, and 90 kg of magnesium hydroxide, all commercially available, were added so as to provide a predetermined ferrite composition. It is noted that the raw materials were powders having a mean particle size of about 3 µm. After the raw materials were mixed in a wet mixer, the mixture was granulated by a pan granulator and calcined at 950° C. for 2 hours. The calcined powder was further pulverized to a mean particle size of 1.5 μm by means of a crusher and a fine grinding mill, granulated by a spray dryer, and molded into an annular shape by means of an automatic powder-molding machine. Using an electric furnace, the molded body was sintered in air (oxygen partial pressure 21%, 1 atm.) at 1,350° C. for 3 hours.

There was obtained an annular magnetic core made of MnO-ZnO-MgO ferrite, which was dimensioned 31 mm in outer diameter, 19 mm inner diameter and 7 mm in thickness. On analysis, the ferrite core was composed of 46 mol% of $Fe_2O_3$, 6 mol% of MnO, 30 mol% of MgO, and 18 mol% of ZnO. The ferrite core was measured for magnetic properties, finding a saturation flux density of 255 mT, an initial permeability of 378, and a core loss of 153 $kW/m^3$. It was confirmed practically acceptable as a deflecting yoke.

According to the invention, practically acceptable two types of ferrite are produced from waste dry cells.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing ferrite from used dry cells, comprising the steps of:

sorting used dry cells into ultra-high power manganese dry cells and a mixture of high power manganese dry cells and alkaline manganese cells, crushing the ultra-high power manganese dry cells into fragments to collect a first fraction containing metal casings, separating a zinc value from the first fraction, crushing the mixture of high power manganese and alkaline manganese dry cells into fragments, sieving the fragments to collect a second fraction composed mainly of positive and negative pole substances, adding the zinc value from the ultra-high power manganese dry cells the second fraction, calcining the mixture to form manganese oxides and zinc oxides, and reacting the manganese oxides and zinc oxides with an iron component tho form the ferrite.

\* \* \* \* \*

UNITED STATES PATENT AND TRADEMARK OFFICE
CERTIFICATE OF CORRECTION

PATENT NO. : 5,707,541
DATED : JANUARY 13, 1998
INVENTOR(S) : TAKASHI KANEMARU, ET AL

It is certified that error appears in the above-identified patent and that said Letters Patent is hereby corrected as shown below:

Column 10, line 22, "tho form"

should read --to form--.

Signed and Sealed this

Sixteenth Day of June, 1998

Attest:

BRUCE LEHMAN

*Attesting Officer*  *Commissioner of Patents and Trademarks*